US006107934A

United States Patent [19]

Andreou et al.

[11] Patent Number: 6,107,934

[45] Date of Patent: *Aug. 22, 2000

[54] REMOTELY OPERATED SELF-CONTAINED ELECTRONIC LOCK SECURITY SYSTEM ASSEMBLY

[75] Inventors: Demos Andreou; Ari Glezer, both of Tucson, Ariz.

[73] Assignee: Schlage Lock Company, San Francisco, Calif.

[ * ] Notice: This patent is subject to a terminal disclaimer.

[21] Appl. No.: 09/013,588

[22] Filed: Jan. 26, 1998

Related U.S. Application Data

[63] Continuation of application No. 08/650,600, May 30, 1996, Pat. No. 5,712,626, which is a continuation of application No. 08/158,018, Nov. 24, 1993, abandoned, which is a continuation of application No. 07/762,919, Sep. 19, 1991, abandoned.

[51] Int. Cl.$^7$ .................... H04Q 1/00

[52] U.S. Cl. .................... 340/825.31; 70/278; 359/142; 341/176; 340/825.69

[58] Field of Search .................... 340/825.31, 825.34, 340/825.69, 825.72, 825.73; 70/272, 278, 283, 386, 210, 216, 477, 478; 359/142; 375/200; 341/176

[56] References Cited

U.S. PATENT DOCUMENTS

| | | | |
|---|---|---|---|
| 2,669,474 | 2/1954 | Kanell . | |
| 3,144,761 | 8/1964 | Lee | 70/277 |
| 3,733,861 | 5/1973 | Lester . | |
| 3,800,573 | 4/1974 | Babb | 70/217 |
| 3,872,435 | 3/1975 | Cestaro | 341/176 |
| 3,911,397 | 10/1975 | Freeny | 340/825.31 |
| 3,939,679 | 2/1976 | Barker | 70/277 |
| 4,031,434 | 6/1977 | Perron | 70/277 |
| 4,079,605 | 3/1978 | Bartels | 70/277 |
| 4,143,368 | 3/1979 | Route | 340/825.69 |
| 4,177,657 | 12/1979 | Aydin | 70/278 |
| 4,189,712 | 2/1980 | Lemelson | 341/176 |

(List continued on next page.)

FOREIGN PATENT DOCUMENTS

| | | |
|---|---|---|
| 0212046 | 2/1986 | European Pat. Off. . |
| 2054726 | 2/1981 | United Kingdom . |
| 2220698 | 1/1990 | United Kingdom . |
| 2227049 | 7/1990 | United Kingdom . |

OTHER PUBLICATIONS

Communication and Broadcasting, vol. 8 No. 1 pp. 35–41 M.A. Lawrence, Sep. 1982.

IEEE Standard Dictionary of Electric and Electronic Terms, p. 370, Aug. 10, 1994.

*Primary Examiner*—Brian Zimmerman

*Attorney, Agent, or Firm*—Merchant & Gould P.C.

[57] ABSTRACT

A locking mechanism for use in a door and the like. A remote handheld controller transmits coded signals to an electronic door lock. A sensor/receiver receives the signals and provides the signal to a processor which compares the coded signals against a predetermined stored signal. If the received coded signal matches the predetermined signal, then the processor generates control signals to actuate an electromechanical device, which acts solely along or about the locking axis, to enable or disable the locking latch. The user is then able to turn the door handle in a normal manner. The coded signals are comprised of two separate signals which are transmitted in segments interleaved with one another. The first signal includes an entrance code, while the second signal provides information concerning the frequency over which the next segments will be transmitted. The processor uses the second signal information to tune the receiver.

19 Claims, 11 Drawing Sheets

U.S. PATENT DOCUMENTS

| | | | |
|---|---|---|---|
| 4,218,681 | 8/1980 | Hermann | 455/603 |
| 4,258,352 | 3/1981 | Lipschutz | 340/825.31 |
| 4,315,247 | 2/1982 | Germanton | 340/825.31 |
| 4,354,189 | 10/1982 | Lemelson | 340/825.31 |
| 4,355,399 | 10/1982 | Timor | 375/202 |
| 4,509,093 | 4/1985 | Stellberger | 361/172 |
| 4,573,046 | 2/1986 | Pinnow | 340/825.56 |
| 4,603,564 | 8/1986 | Kleinhny | 70/277 |
| 4,672,829 | 6/1987 | Gater | 70/472 |
| 4,770,012 | 9/1988 | Johansson | 70/278 |
| 4,794,268 | 12/1988 | Nakano | 340/825.31 |
| 4,802,353 | 2/1989 | Corder | 70/277 |
| 4,820,330 | 4/1989 | Lin | 70/277 |
| 4,827,744 | 5/1989 | Namazue | 70/252 |
| 4,835,407 | 5/1989 | Kataoka | 340/825.31 |
| 4,850,036 | 7/1989 | Smith | 375/202 |
| 4,854,143 | 8/1989 | Corder | 340/825.31 |
| 4,864,588 | 9/1989 | Simpson | 375/200 |
| 4,866,433 | 9/1989 | Akutsu | 340/825.31 |
| 4,895,009 | 1/1990 | Kleefeldt | 70/264 |
| 4,901,545 | 2/1990 | Bacon | 70/278 |
| 4,914,732 | 4/1990 | Henderson | 340/825.17 |
| 4,949,562 | 8/1990 | Thorncraft | 70/277 |
| 4,964,023 | 10/1990 | Nishizawa | 362/100 |
| 5,004,278 | 4/1991 | Kang | 292/169.18 |
| 5,040,391 | 8/1991 | Lin | 70/277 |
| 5,052,205 | 10/1991 | Poli | 70/386 |
| 5,079,435 | 1/1992 | Tanaka | 340/825.31 |
| 5,083,122 | 1/1992 | Clark | 340/825.31 |
| 5,121,618 | 6/1992 | Scott | 70/386 |

REMOTELY OPERATED SELF-CONTAINED ELECTRONIC LOCK SECURITY SYSTEM ASSEMBLY

This application is a Continuation of application Ser. No. 08/650,600, filed May 30, 1996, now U.S. Pat. No. 5,712, 626 which is a file wrapper continuation of application Ser. No. 08/158,018, filed Nov. 24, 1993 (now abandoned), which is a file wrapper continuation of application Ser. No. 07/762,919 filed Sep. 19, 1991 (now abandoned), which applications are incorporated herein by reference.

FIELD OF THE INVENTION

The present invention relates generally to locks, and more particularly to an electronic lock which is remotely operated either optically or by radio transmission and which is sized, arranged and configured to be utilized with a conventional doorlatch lock mechanism.

BACKGROUND OF THE INVENTION

Since the advent of modern semiconductor circuits, most notably the microprocessor, efforts have been made to design an electronic door lock which provides a secure, "pick-proof" lock that incorporates the advantages offered by a microprocessor. Several such attempts at designing electronic locks are described in U.S. Pat. Nos. 4,573,046; 4,964,023 and 4,031,434. Each of the structures described in the foregoing patents suffers from a common drawback; they cannot be directly utilized within the structures of existing conventional doorlatch locks. Such prior art electronic lock structures generally require new locking hardware to be installed and additional holes to be bored through the door and into the door jamb itself. For example, U.S. Pat. No. 4,573,046, issued to Pinnow, generally discloses an electronic transmitter/receiver locking system wherein the transmitter is preferably located in a watch worn on the user's wrist. The reference does not describe, in other than a conceptual manner, that apparatus which is responsive to a signal receiver located in the door, that would physically actuate the lock mechanism. However, the reference clearly suggests modifying the conventional doorlatch lock hardware so as to implement the locking function. Besides the lack of compatibility with existing door locks, such prior art electronic lock designs suffer other shortcomings.

U.S. Pat. No. 4,964,023, issued to Nishizawa et al. generally discloses an illuminated key wherein the emitted light can be modulated to perform an additional keying function. Presumably, frequency shift keying modulation (i.e., FSK modulation) is utilized, which is easy to duplicate, thereby significantly reducing the security provided by such locking mechanism. Duplication of the FSK modulation "key" may be accomplished, for example, by using a "universal" TV/VCR remote control which has a "learning" function. Duplication can be achieved by simply placing the original "key" in proximity with the "universal" controller and transmitting the key's optical information directly into the controller's sensor.

U.S. Pat. No. 4,031,434, issued to Perron et al. generally discloses an inductively coupled electronic lock that uses a binary coded signal. The key transmits an FSK signal encoded with a preprogrammed code by magnetic induction to a lock unit. The lock unit processes the signal from the key and activates a motor that moves a deadbolt. The power source for both the key and the lock unit is contained in the key. This type of locking device is extremely sensitive to noise and requires fairly close operative proximity between the "transmitter" and the "receiver."

U.S. Pat. Nos. 4,770,012 issued to Johansson et al., and 4,802,353 issued to Corder et al. disclose relatively complicated combination type electronic door locks that are partially powered by built-in batteries. The exterior handles of these locks are used to receive user generated entrance codes in a manner similar to mechanical combination locks and use relatively primitive programming schemes. Such lock structures do not use the conventional style doorlatch lock structure but are switched between locked and unlocked states by means of an internal electromagnetic solenoid which retracts an internal pin that allows rotation of the exterior handle and opening of the door. The U.S. Pat. No. 4,802,353 lock also provides for a mechanical key override for the electronic lock structure and can be used with an infrared communication link to activate a remotely located deadbolt lock, of the type described in U.S. Pat. No. 4,854, 143. In each of the locks described in these patents, the energy for actually moving the lock latch relative to the door strike plate is provided by the user.

The concept of using an electromagnetic locking device such as disclosed in the above three patents has a number of drawbacks. First, such devices require substantial electrical power since the solenoid electromagnets must remain energized in order to keep the locks in their unlocked states. Accordingly, battery replacement is frequent. For example, U.S. Pat. No. 4,770,012 discloses that the lock battery lasts through roughly 9,000 locking operations, which at a normal door usage rate of 30 operations a day, would be less than a year. U.S. Pat. No. 4,802,353 discloses that the battery lasts 180 days under the same conditions. Second, such electromagnetic devices are also extremely slow. The deadbolt electromagnet disclosed in U.S. Pat. No. 4,854,143 requires 8 seconds and 4 seconds respectively to switch to the unlocked and locked states. The door electromagnet disclosed in U.S. Pat. No. 4,802,353 requires four seconds to switch to the unlocked state. Third, the electromagnetic devices which are selected for this application are designed to operate at low currents and cannot resist strong forces along their axes of motion. This means that they cannot be loaded by stiff springs and can be easily tampered with by the application of moderate external magnetic fields. Fourth, in addition to the length of time taken to operate the solenoid, additional time (at least 8 seconds) is required to enter a correct combination code, making the total elapsed time to open a door on the order of 16 seconds. This is much longer than the time required to open a door with a conventional key-operated lock mechanism.

Further disadvantages of the above described electronic combination lock systems are that the entrance code may be visibly detected by others, disabled persons (e.g., blind people) cannot typically use such locks, and those with mechanical overrides features can generally be picked. Also compared to conventional door lock configurations, the above-described combination locks generally require new manufacturing and tooling procedures (as compared to those required for conventional doorlatch locks) and must be partly constructed from nonferrous materials in the vicinity of the electromagnetic device, which limits production options.

What is notably lacking in electronic lock structures heretofore known in the prior art is a simple, "pick-proof" low power lock configuration that is compatible with the internal mechanical locking mechanisms of universally used conventional key-operated doorlatch locks. Such an electronic door lock design would be compatibly usable with, and could readily be designed by lock manufacturers into, existing doorlatch lock structures with a minimum of engineering or production tooling effort or cost. Virtually all existing conventional mechanical lock structures use the rotational motion of a mechanical key about the axis of the key acceptor cylinder to move a locking member. The rotational motion of the key is either directly used to rotate a locking member or is immediately translated into linear motion of a locking member which moves generally along the axis of the key acceptor cylinder. Such simplicity and effectiveness of the conventional mechanical doorlatch locks has not been heretofore duplicated by the complicated, high power consuming or ineffective prior art electronic lock structures.

The present invention addresses the shortcomings of prior art electronic locking structures by using sophisticated low power electronic components to directly replace the mechanical key and key accepting lock cylinder portions of conventional mechanical doorlatch locks while retaining the internal mechanics of such locks for performing the actual door locking functions. Such electronic lock hardware which is designed for compatibility with existing conventional doorlatch locks allows manufacturers' investments in current door lock manufacturing facilities to be retained and takes advantage of state-of-the-art microprocessor-based electronics to control plural lock functions including sophisticated entrance codes, record keeping of authorized entrances, etc.

SUMMARY OF THE INVENTION

The present invention provides a simple, relatively inexpensive and yet reliable apparatus and method for actuating a locking mechanism for use in a door and the like. The apparatus is designed and preferably sized and configured to take advantage of existing conventional doorlatch lock hardware. For example, the mechanical "locking" portion of the apparatus and an optical or radio frequency sensor is preferably constructed so as to be installable within the exterior handle of a conventional door handle, while the interior handle is equipped with a battery and an electronic control device. With the exception of the key acceptor cylinder and modification of the door handle knobs, all of the remaining components of previously known conventional doorlatch locks, including the latch, mechanical locking elements located within the bore of the door and the strike plate can be utilized in the same manner as heretofore known in the art.

In general, the locking apparatus of the invention comprises a remote hand held controller (HHC) which includes a miniature optical or radio frequency transmitter; an electronic door lock (EDL) which includes an optical or radio frequency sensor placed externally from that area to be secured by the EDL; a processor control circuit connected to the sensor, and an electromechanical device for actuating the mechanical locking elements of the EDL. The apparatus of the present invention may further include an electronic programmer (EDLP) for the EDL and HHC which is used to input desired entrance codes and to control other functions of the HHC and the EDL. Preferably, communication between the HHC and EDL (and between the EDLP and the HHC or EDL) is two-way, however, single way communication between the HHC and EDL is possible, as described below.

Generally, upon operator initiation, the transmitter generates a signal which is received by the sensor. The signal is processed by the processor, which compares the signal with predetermined stored signals to determine whether the received signal constitutes a valid lock actuating sequence. In the event that the sequence is determined to be valid, the processor actuates an electromechanical device (such as a D.C. motor or the like) to rotate the conventional locking rod of a doorlatch lock. The user then is able to turn the door handle in a normal manner. As those skilled in the art appreciate, the user supplies the majority of the energy to open the door. As a result, the electromechanical device need only generate enough torque to turn the locking rod or turn bar (as those terms are understood in the art) a fraction of a revolution and can be sized small enough to reside within the handle portion of the doorlatch. In the event that the received signal sequence is determined to be an invalid signal, the processor resets to receive a second signal and the process is repeated. After a predetermined number of invalid signals are received, the system disables itself for a predetermined time period in order to discourage a concerted attempt to methodically try each possible code combination (e.g., through use of a computer).

The present invention also preferably provides for high-security two-way communication between the EDL and HHC, a limited-access procedure based on "master" and "submaster" key concepts, and implementation by means of a miniature electromechanical device which requires minimal electrical power.

Another feature of the present invention is that the lock cannot be "picked" because there is no mechanical lock cylinder and because a spread spectrum communication (SSC) technique is used.

As a consequence of the advantages and features of the present invention, an electronic lock apparatus constructed according to the principles of this invention can be readily implemented in virtually any conventional mechanical doorlatch lock currently available on the market with minimal modifications of production procedures.

Therefore, according to one aspect of the invention, there is provided an electronic lock apparatus, comprising: (a) a strike plate; (b) a latch cooperatively engageable with said strike plate and movable between engaged and disengaged positions; (c) mechanical locking means, operatively connected with said latch, for selectively preventing movement of said latch between said engaged and disengaged positions, said locking means requiring a primary motive force acting along or about a locking axis; (d) electromechanical means, operatively connected to said mechanical locking means, for providing the primary motive force to said locking means; and (e) electronic control means, responsive to an encoded received signal, for selectively energizing said electromechanical means, wherein said electromechanical means provides force only along or about the locking axis.

According to another aspect of the invention, there is provided an apparatus as recited above, wherein said encoded received signal includes a first set of encoded signals and a second set of encoded signals, wherein both of said first and second sets of encoded signals must be determined to be valid by said electronic control means prior to energizing said electromechanical means.

A further aspect of the invention provides for an electronic lock system, comprising: (a) key means for generating a signal; (b) receiver means for receiving said signal; (c) processor means, cooperatively connected to said receiver means, for comparing said received signal with a stored reference signal and for generating an actuation signal if said received signal is determined to be equivalent to said reference signal; (d) primary mover means, operatively connected to said processor means and wherein said primary mover means includes a shaft cooperatively connected to a lock mechanism which is engaged and disengaged by a rotation of a locking rod about the longitudinal axis of said rod, for rotating said rod in response to said actuation signal, whereby only the rotation of said rod is utilized to lock and unlock the lock mechanism.

According to still another aspect of the present invention, there is provided an electronic lock apparatus, of the type wherein a signal is transmitted from a remote location to the lock location to actuate an electromechanical device to change the status of the lock latch, comprising: (a) means for generating a first coded signal and a second coded signal, wherein said first and second coded signals are transmitted in segments which are interleaved with one another and wherein segments of said second coded signal contain information related to the frequency on which the next subsequent segments of said first and second coded signals will be transmitted; (b) processing means for receiving said first and second coded signals, including: (i) memory means for storing predetermined valid signals and frequencies; (ii) determining means for comparing said received first and second coded signals with said predetermined valid signals; and (iii) output means to provide actuation signals to the electromechanical device to change the status of the lock latch.

These and other advantages and features which characterize the present invention are pointed out with particularity in the claims annexed hereto and forming a further part hereof. However, for a better understanding of the invention, its advantages and objects attained by its use, reference should be made to the Drawing which forms a further part hereof and to the accompanying descriptive matter, in which there is described a preferred embodiment of the present invention.

BRIEF DESCRIPTION OF THE DRAWING

Referring to the Drawing wherein like parts are referenced by like numerals throughout the several views.

DETAILED DESCRIPTION

The principles of the invention apply particularly well to utilization in a lock of the type used to secure a door in its closed position. A preferred application for this invention is in the adaptation of conventional mechanical (i.e., physical key-operated) doorlatch locks to electronic, keyless locks. Such preferred application, however, is typical of only one of the innumerable types of applications in which the principles of the present invention may be employed. For example, the principles of this invention also apply to deadbolt locks, window locks, file cabinet locks and the like.

A preferred embodiment of the electrically related portion of the invention includes electronic door lock circuitry which is configured, as hereinafter described in more detail, for mounting within the hollow recess portions of the door handles of a doorlatch structure. For ease of description, this circuitry will hereinafter be referred to simply as the "EDL." The EDL generally includes an optical or radio frequency sensor mounted in the externally facing doorknob, a microprocessor controller connected to receive signals from the sensor, and an electromechanical device (such as a D.C. motor) operatively controlled by the microprocessor controller and connected to physically actuate the doorlatch locking rod. Also included in the electronically related portion of the invention is a high-efficiency battery for powering the EDL circuitry.

The EDL circuitry communicates with a remote hand held controller (i.e., a hand-held remote key) using a low-power two-way optical or radio frequency transmitter/receiver. For ease of description, this hand held controller will hereafter be referred to as an "HHC". Thus, the need for a dedicated physical key is eliminated, and as will become apparent upon review of the disclosure herein, lock security is substantially improved. As noted above, the present invention is preferably installed/implemented within existing lock hardware (or constructed to resemble/match existing lock hardware) so that modification of existing lock hardware dimensions is unnecessary. As a result, implementation of products in accordance with the invention requires minimal modification of current procedures for the production and installation of door locks.

The invention also optionally includes an electronic programmer (hereinafter simply referred to as an "EDLP") for programming the EDL and HHC for desired entrance codes and to control other functions of the HHC and EDL.

Figure 1:
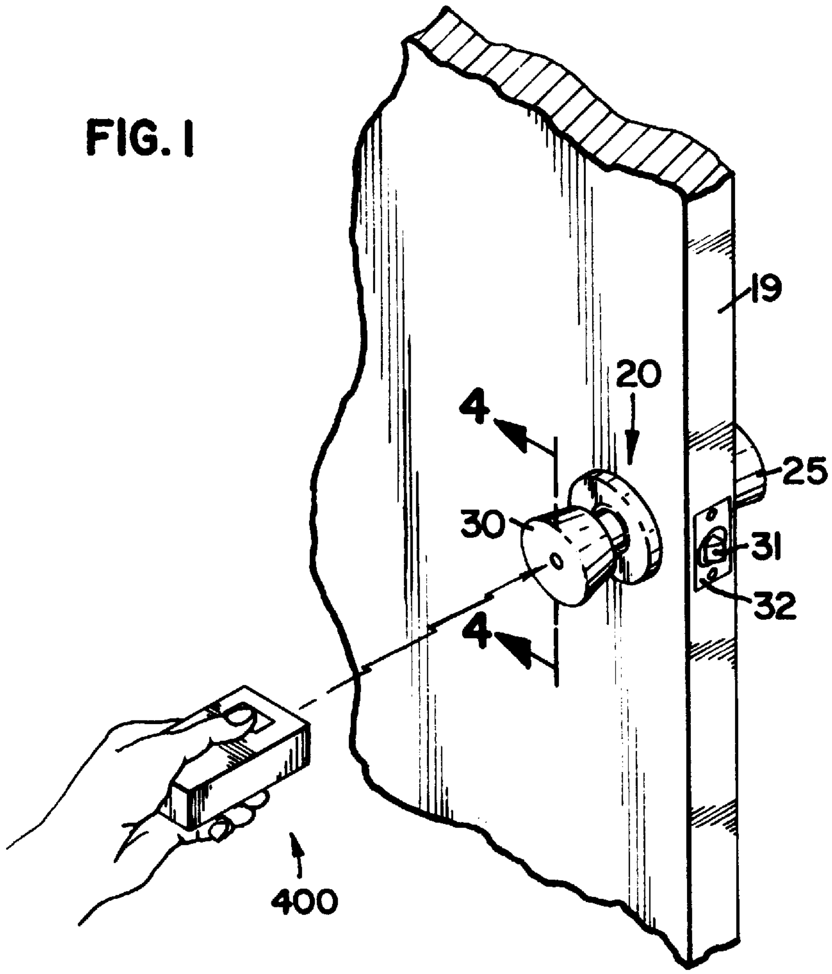
FIG. 1 is a view of a conventionally styled doorlatch illustrated as installed in a door, which incorporates an electronic lock constructed according to the principles of the present invention.

Referring now to the figures, there is generally shown at 20 in FIG. 1 a doorlatch lock apparatus as operatively mounted in a door 19. The doorlatch 20 as will be referred to herein is constructed in a "conventional" configuration well known in the art, having interior and exterior handles 25 and 30 respectively which are cooperatively connected through linkage means within the door 19 to operatively move and lock a latch member 31. The latch member 31 engages a strike plate 33 (best seen in FIG. 2) in an associated door frame (not shown) to secure or release the door 19 for pivotal motion within the door frame in a manner well known in the art. Although one embodiment thereof will be herein described, the internal linkage means of the doorlatch 20 that connects the handles 25 and 30 may be of varied configurations as will be appreciated by those skilled in the art. Since the details of construction and operation of such varied configurations of conventional doorlatch mechanisms are not relevant to an understanding of the principles of this invention, they will not be detailed herein except to provide a general overview thereof and to the extent that an understanding of the mechanical locking portions thereof may be necessary. Such doorlatch structures are commonly found in numerous patents, the marketplace, and on most doors and can be directly examined if more detailed information thereon is desired.

Figure 2:
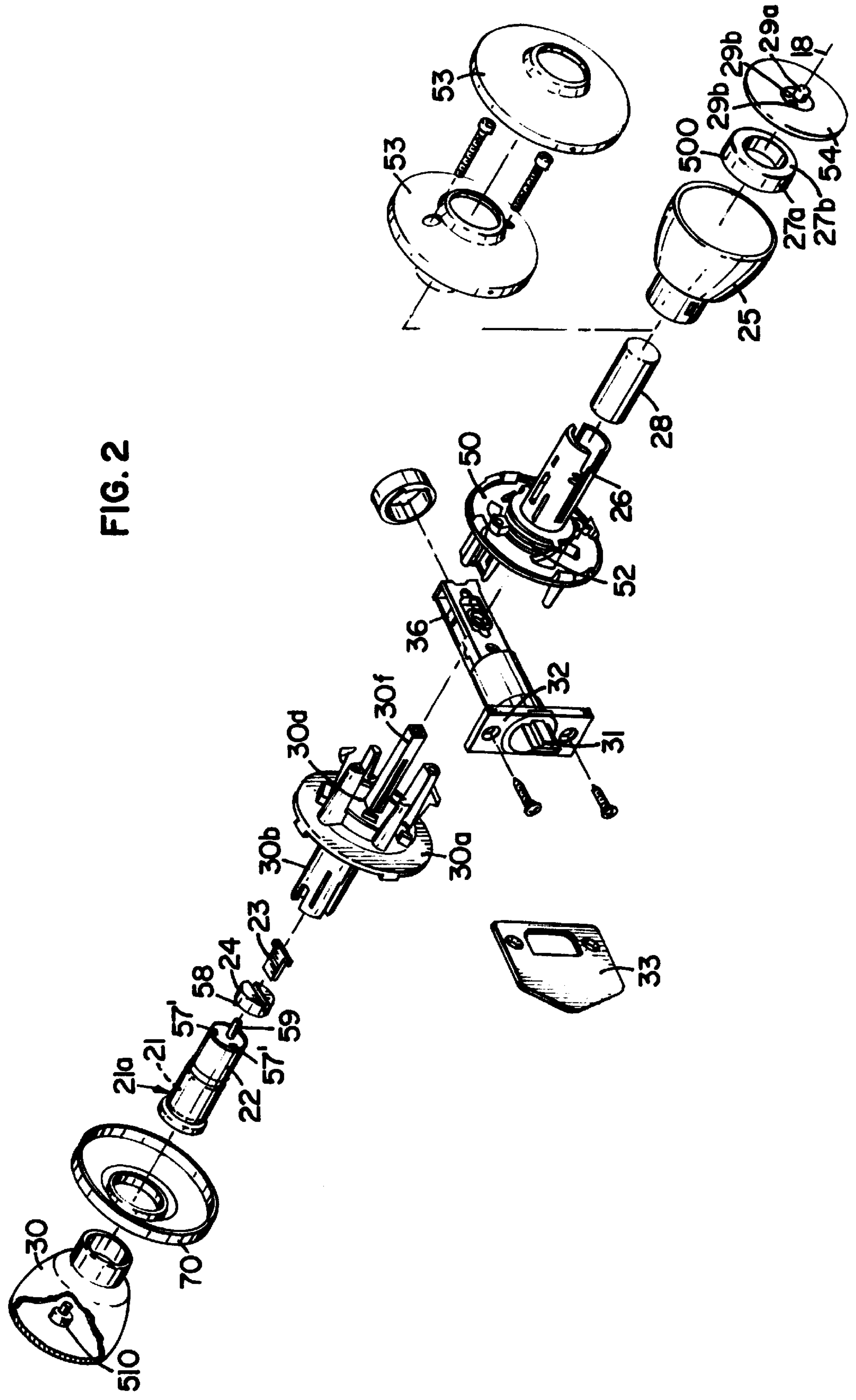
FIG. 2 is a perspective exploded view of the electronic doorlatch lock of FIG. 1.

An example of the linkage mechanism of one embodiment of a conventional doorlatch locking apparatus which has been modified to incorporate the principles of this invention is illustrated in FIG. 2. For convenience in describing the present invention, the remote HHC circuitry and the EDL components which reside in the doorlatch 20 will collectively be referred to as the "electronic lock". Referring to FIG. 2, an electronics module 500 containing those electrical components of the EDL (functionally illustrated in FIG. 7) is sized and configured for mounting within the inside handle 25 of the doorlatch 20. As is illustrated in the Figures, handles 25 and 30 are standard hollow knobs which allow the EDL electronics 500, motor 21 etc. to be located entirely within the knobs. The interior handle portion of the doorlatch 20 includes a mounting bracket 50 that is fixedly secured from movement relative to the door 19 through a bore in the door 19 to a corresponding mounting bracket 30*a* for the external handle portion. A hollow cylindrical shaft 26 is rotatably mounted to the bracket 50 for rotation under spring tension from spring 52 about axis 18. When the doorlatch 20 is mounted to the door 19 the shaft 26 extends through the cover plate 53. The inner door handle 25 is detachably secured in a manner well known in the art, to the shaft 26 such that the shaft can be rotated against bias of the spring 52 by turning movement of the handle 25 about the axis 18.

Figure 7:
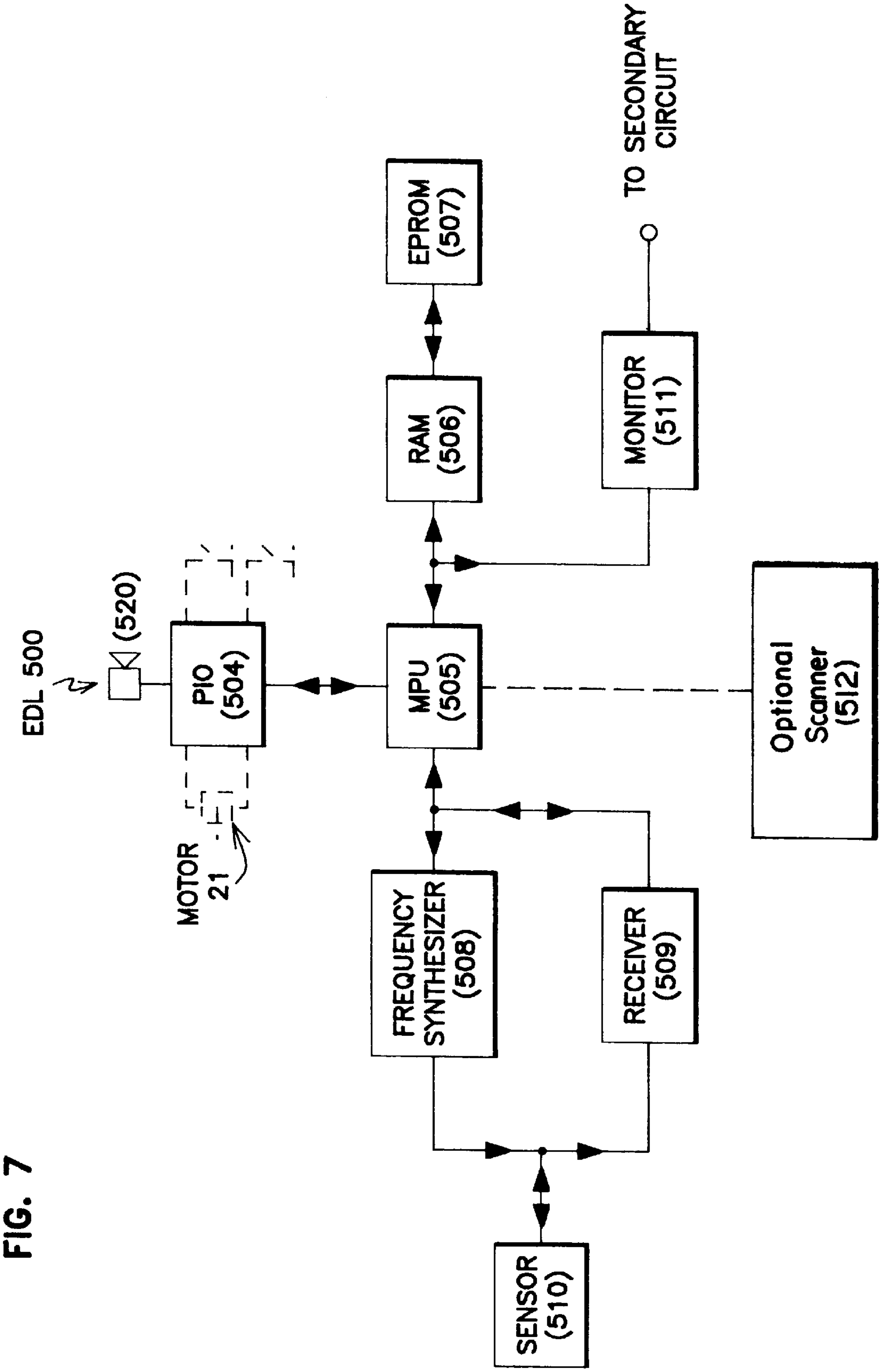
FIG. 7 is a functional block diagram representation of the electronic door lock (EDL) portion of the doorlatch lock of FIG. 2.

The electronics module 500 containing the electrical circuitry, interconnections, circuit boards, etc., to configure the EDL functions of FIG. 7 is appropriately packaged between inner and outer cylindrical mounting tubes 27*a* and 27*b* respectively. The inner mounting tube 27*a* is sized to coaxially overlie and to be frictionally or otherwise secured to the shaft 26, as illustrated in FIG. 2. A high efficiency cylindrical battery pack 28 is sized for mounting within the cylindrical shaft 26 and has an appropriate voltage for energizing the electric components of the EDL. The battery terminals are appropriately connected (not illustrated) to operatively power all electrical components of the EDL that are housed within the doorlatch 20. In the preferred embodiment, the end cap 54 of handle 25 is detachable to provide access to the battery 28 and electronic module 500 circuits housed within the handle 25. Preferably, the end cap 54 also contains a centrally located switch, generally illustrated at 29*a*, and one or two light emitting diode indicators 29*b* (appropriately connected to the electronic module 500) for permitting manual lock activation from the inside handle 25 side of the door 19. The indicators 29*b* provide a visual indication of the locked status of the electronic lock at any point in time. Alternatively, the lock status indicator may be mechanical so as to conserve battery life and be activated by the D.C. motor from one state to another as those skilled in the art will appreciate.

Figure 4:
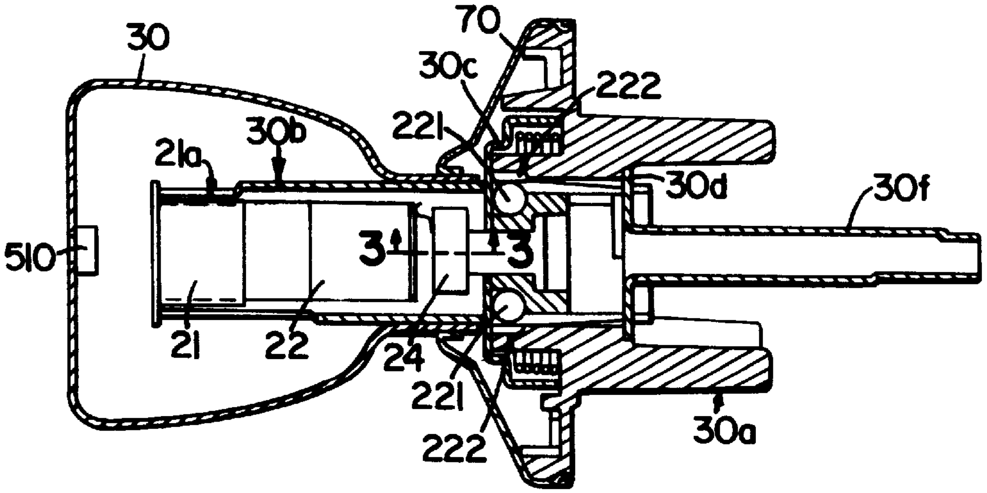
FIG. 4 is a cross-sectional view of the exterior door handle portion of the doorlatch lock of FIG. 1, generally taken along line 4—4 of FIG. 1.

That portion of the door latch lock that faces the "outside" of the door is illustrated in FIGS. 2 and 4. Referring thereto, the stationary outer mounting bracket 30*a* has a hollow cylindrical shaft 30*b* mounted for rotation therein about the axis 18 in manner similar to that of bracket 50 and shaft 26. When mounted to the door 19, the shaft 30*b* extends through an external cover plate 70. The outer door handle 30 is secured to the shaft 30*b*, such that shaft 30*b* rotates with movement of the handle 30 and such that the handle 30 cannot be detached from the shaft 30*b* from the outside of the door when the door is closed, all as is well known in the art. The shaft 30*b* is connected to an outer retainer housing member 30*c* that rotates with the shaft 30*b*. An inner housing retainer member 30*d* is operatively connected for rotation with the inner housing retainer member 30*c*. The mechanical locking members of the doorlatch assembly are housed between the housing retainer plate members 30*c* and 30*d* as will be described in more detail hereinafter. An extension 30*f* of the inner housing retainer member 30*d* longitudinally extends along the axis 18 toward the inner handle assembly and forms a coupling rod between the shafts 26 and 30*b* and their respective handles 25 and 30. The shaft 26 terminates at its inner end at a retaining plate (not illustrated) but located for rotation adjacent the inner surface of the mounting bracket 50. The retaining plate has an axially aligned aperture formed therethrough which slidably matingly engages the coupling rod 30*f* when the doorlatch 20 is mounted to the door 19 such that the shafts 26 and 30*b* rotatably move together about the axis 18 as constrained by the coupling rod 30*f*. The coupling rod 30*f* also passes through a keyed aperture in the latch actuating assembly generally designated at 36. The latch actuating assembly 36 operates in a manner well known in the art to longitudinally move the latch member 31 relative to the mounting plate 32 against a spring bias tending to keep the latch 31 in an extended position, in response to rotational movement of the coupling rod 30*f* within the keyed aperture of the latch actuating assembly 36.

Figure 3:
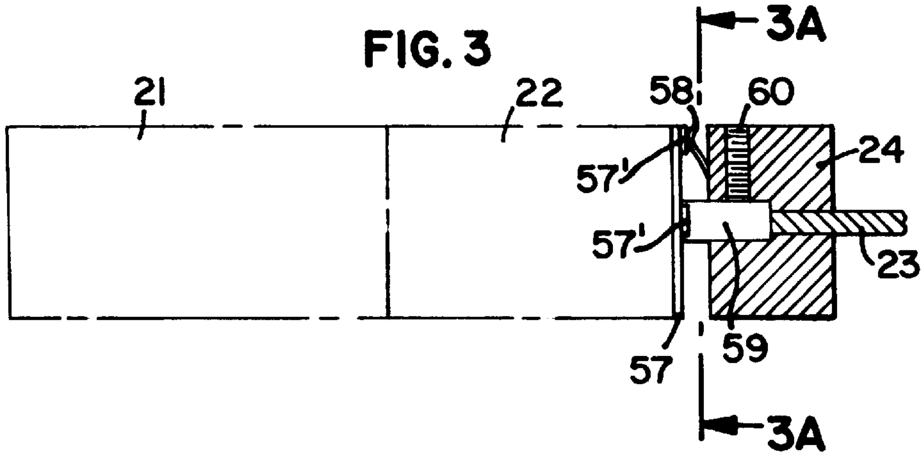
FIG. 3 is an enlarged cross sectional view of the switching contacts and coupling (with the D.C. motor 21 and gearhead 22 shown in phantom) of the doorlatch lock of FIG. 2 taken through line 3—3 of FIG. 4.

Referring to FIG. 2, a DC motor assembly generally designated at 21 is mounted within the cylindrical shaft 30*b*. The motor assembly includes a motor mounting housing 21*a* which secures the assembly to the shaft 30*b*, a DC motor 21, a gear reducer 22, a switch contactor plate 57, an electrical leaf contact 58 (best seen in FIG. 3) forming a sliding contact with the switch contactor plate 57, and a coupling member 24. The coupling member 24 is secured to the shaft 59 of the motor 21/gearhead 22 by means of a set screw 60 such that the leaf spring contact 58 that is secured to the coupling member 24 is positioned at a desired rotational angle relative to the switch contactor plate 57. The contactor plate 57 has a pair of angularly spaced contacts 57' that are selectively engaged by the leaf spring contact 58 as the motor shaft turns the coupling 24. The contacts 57' and the leaf spring contact 58 combine to form a single pole switch for energizing the DC motor 21. The outer case of the motor is connected to ground potential. That surface of the coupling 24 that faces away from the DC motor 21 defines a slot which matingly secures one end of a locking rod 23. Locking rod 23 axially extends from the coupling 24 through a cam 223 located in the locking mechanism chamber defined by the retaining plates 30*c* and 30*d*. The electrical energization of the motor 21 from the battery 28 is performed in a well known manner using wires (illustrated diagramatically in FIG. 7).

Figure 5:
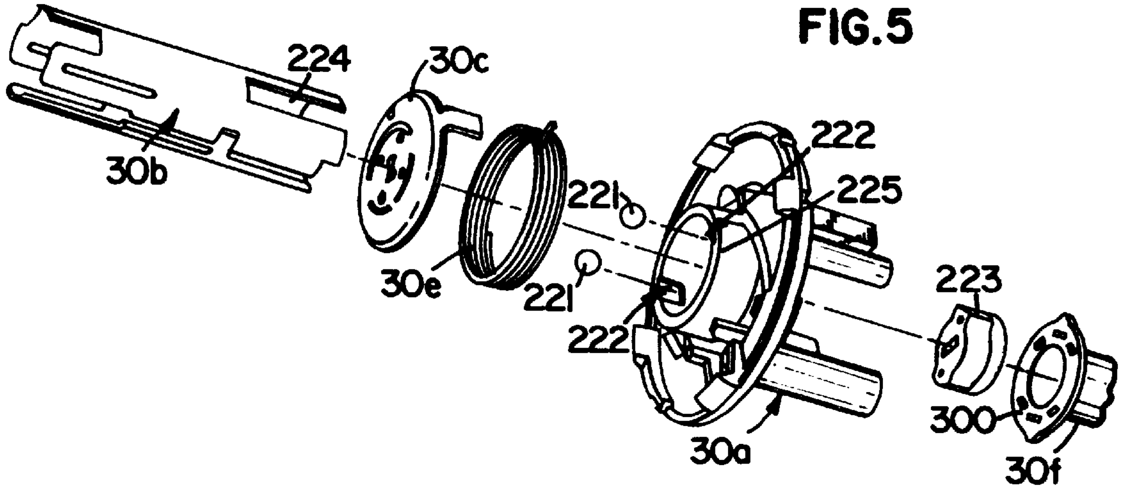
FIG. 5 is an enlarged exploded perspective view illustrating the mechanical locking mechanism portion of the doorlatch lock of FIG. 2.

Referring to FIG. 5, the shaft member 30*b* extends through a keyed annular shoulder of the outer housing 30*a*.

The shaft 30*b* has a pair of longitudinally extending slots 224 that align with a pair of keyed slots 222 in the shoulder 225. The cam 223 has a pair of cam surfaces that cooperatively address the aligned slots and move a pair of steel balls 221 into and out of the aligned slots as the cam 223 is rotated by the locking rod 23, as will be described in more detail hereinafter.

The outer handle 30 preferably has an aperture formed therethrough, sized and configured to admit a sensor 510 which receives radio frequency or optical signals from the HHC. Sensor 510 is operatively connected to the electronics module 500 and appropriately connected within the outer handle 30 so as to receive the signals entering the handle aperture. Sensor 510 is either an optical (e.g., infrared (IR)) or radio frequency (RF) sensor, best illustrated in FIG. 2.

As those skilled in the art will recognize, when the locking mechanism is in the unlocked state, the lock is actuated by rotation of internal and external handles 25, 30, whereby rotation of either handle turns shafts 26 and 30*b*, respectively, which retracts the doorlatch 31 to a position within plate 32. This action releases the doorlatch 31 from the strike plate 33 thereby allowing the door 19 to be opened.

As noted above, locking mechanisms are generally well known in the art and so will not be described in additional detail herein. Those wishing a more thorough background on such devices may refer to U.S. Pat. Nos. 2,669,474; 4,672,829 or 5,004,278. In the preferred embodiment, a lock mechanism manufactured by Master Lock of Milwaukee, Wis., having a designation Model No. 131 is utilized. Briefly, the lock is physically switched from the unlocked to the locked state by the two steel balls 221 when they are positioned by cam 223 to ride within the annular channel 222 as shown in FIG. 5. When the balls 221 are positioned in channel 222, they are positioned through slots 224 of the sleeve 30*b* to prevent rotational motion of sleeve 30*b*. When the balls are moved out of the channel 222 by cam 223, the lock is switched from a locked to an unlocked state. Cam 223 is operatively rotated by the locking rod 23. The lock is switched from the locked to the unlocked state and vice-versa whenever the locking rod 23 and the cam 223 are rotated approximately a quarter of a turn in either the clockwise or counterclockwise directions. In the locked state the sleeve 30*b* is prevented from rotating relative to the outer housing 30*a*. The handle 30 is thereby prevented from turning, keeping the doorlatch 31 from retracting.

Most lock mechanisms have an axis of rotation which is defined as the axis around which torque is applied to cause the latch to open the door (i.e., motion about the axis of the key acceptor cylinder). The mechanism which blocks the rotation in the preferred lockset rides on a cam which turns about the axis, while others very typically utilize other blocking means based on rotation about or along the axis. Those skilled in the art will therefore appreciate that mechanical motion provided by a physical key in conventional mechanical doorlatch locks also acts about the lock axis. The DC motor of the preferred embodiment is configured to act about the same lock axis as that of the key accept or cylinder that it replaces. The shaft of the motor does not introduce any movement which is not about the lock axis. Further, actuation of the DC motor assembly 21 (i.e., the electromechanical device which rotates the locking rod 23) requires very little torque or energy to lock or unlock the door via this method. It should be understood that other locking mechanisms (e.g., the lock manufactured by Master Lock Company of Milwaukee, Wis. having the designation S.O. 3211X3 ADJ.B.S.) uses a motion along the lock axis. Those skilled in the art will appreciate that the electromechanical device might provide this motion along the axis rather than about the axis. The lock axis of the preferred embodiment is illustrated by the line denoted by 18 in FIG. 2.

Next, in order to better understand the EDL and HHC and the method of signaling therebetween, a discussion of the electrical components will be deferred pending a general discussion of the operation of the electronic lock.

General Operation

Figure 6:
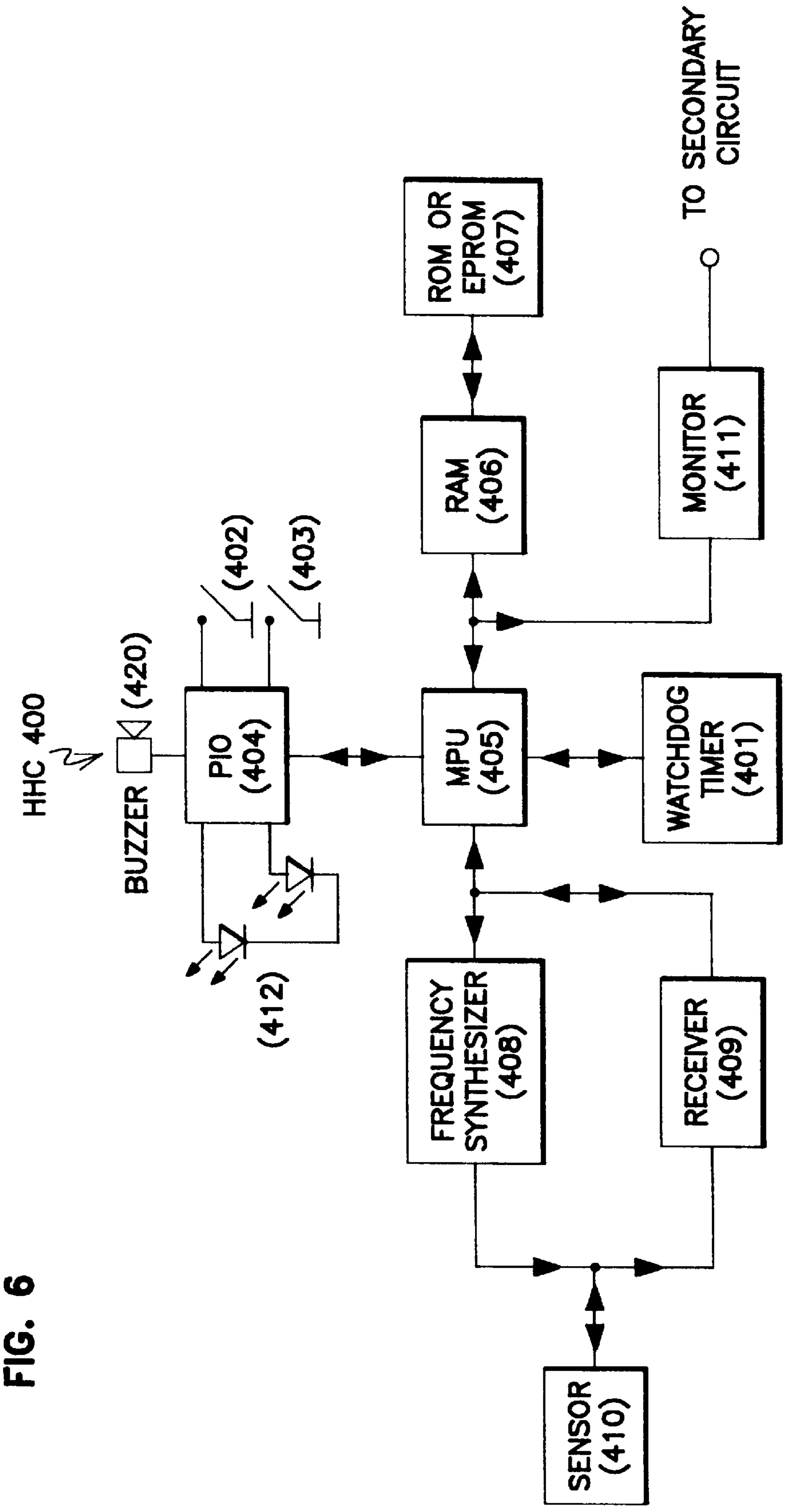
FIG. 6 is a functional block diagram representation of the hand held controller portion (HHC) of the doorlatch lock of FIG. 2.

Referring next to FIGS. 2, 6 and 7 a functional block diagram of the circuitry 400 of a preferred hand-held (preferably battery operated) controller. (HHC 400) which is capable of a two-way communication with the lock without mechanical contact is illustrated. The two-way communication is preferably accomplished using either infrared (IR) light or radio waves (RF). Alternatively, another means of inexpensive one-way optical communication may be accomplished with pattern recognition (e.g., "barcode" technology) and will be further discussed below. The HHC 400 contains a circuit which transmits on command (by pressing either a "lock" or an "unlock" button on the HHC, as depicted at 402 and 403 respectively) a programmable entrance code to a sensor preferably located within the external handle 30. Those skilled in the art will recognize that the circuit may be a proprietary integrated circuit (IC) or may be implemented using discrete components as will be described herein. As noted above, the standard key cylinder of a current typical door lock is replaced in the EDL by a sensor 510 and an electromechanical device 21 which reside within the exterior handle 30. An electronic package 500 resides within the interior handle 25.

Figure 3A:
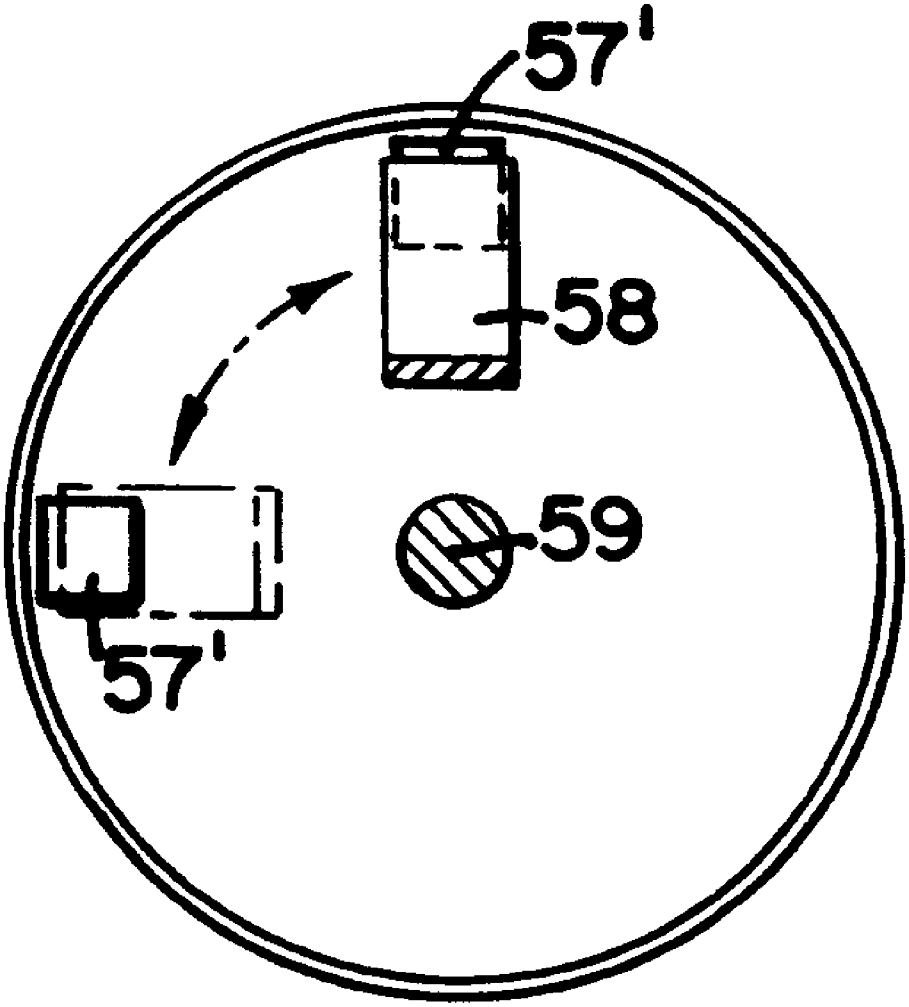
FIG. 3A is an enlarged cross-sectional view of the switching contacts and coupling (with rotation thereof shown in phantom) taken through line 3A—3A of FIG. 3.

The microprocessor 505 of the EDL 500 (shown in FIG. 7) communicates with the HHC 400 via sensor 510. The entrance code is verified and if it matches a pre-programmed code which resides in a local nonvolatile memory, then electromechanical device 21 is actuated to switch the EDL to an unlocked (or locked) state. In the preferred embodiment the electromechanical device 21 is a miniature DC motor with a 256:1 gear reducer 22. The electromechanical device rotates the locking rod 23 approximately ¼ turn either clockwise or counterclockwise to switch the lock to a locked or an unlocked state, respectively. In the preferred embodiment, the switching operation is accomplished within less than one second, although those skilled in the art will immediately appreciate that the gearing, motor shaft speed, voltage applied to the motor, and lock type will all affect the time in which the locking operation occurs. The gear reducer 22 is cooperatively connected to a non conductive disk 57 with a single pole switch having two end contacts 57' thereon (best seen in FIGS. 1, 3, and 3A). Disk 57 interacts with leaf spring contact 58 to stop the motor 21 when the EDL is switched to either a locked or an unlocked state. When either one of the switches is engaged a signal is transmitted back to the HHC to verify that the EDL is either locked or unlocked. The HHC contains a bi-color LED (412) which is lit briefly upon receipt of the confirmation signal from the EDL (e.g., green when unlocked, and red when locked). Those skilled in the art will immediately recognize that other signals might also be incorporated such as an audible confirmation signal.

The mechanical actuation of the door lock (i.e., opening of the door from the outside using handle 30 or from the inside using handle 25) is provided by the user after the EDL is internally switched to the unlocked (or locked) state. Thus, the user provides the torque to bias the spring loaded rotating shaft 30*f* to retract the doorlatch 31. Thus, since the DC motor 21 only needs to rotate the locking rod 23 and cam 223, a very small low torque motor may be utilized which need not rotate about a long arc. In the preferred embodiment, the shaft of the gear reducer 22 can be rotated about an arc of only 10° in order to successfully switch the EDL from the locked to the unlocked position (and vice-versa). However, the amount of rotation is a matter of design choice and type of locking mechanism with which the EDL is utilized, as will be appreciated by those skilled in the art. The switch 57 located on the gear reducer 22 while being used to cut the power to the motor 21, is also used, after a brief delay, to turn off the power to the rest of the electronic package 500 of the EDL in order to conserve power. Those of skill in the art will also recognize that since a processor is utilized, it might be advantageous in certain instances to monitor the current drawn by DC motor 21 to determine when the rotation required to lock or unlock the locking mechanism has been completed (i.e., assuming that the shaft rotation will be stopped by the locking mechanism itself after a rotation through a certain arc, as in the preferred embodiment and other typical locks, thereby stalling the motor after which a larger current is drawn through the motor), rather than by utilizing the preferred mechanical switch discussed herein.

As noted above, the interior handle 25 of the EDL is equipped with a central button 29*a* for manual switching of the EDL from the locked to the unlocked state and vice-versa. Built-in LEDs 29*b* are used to provide a visual indication of whether the door 19 is locked or unlocked. The electronic package 500 and the battery 28 are inserted in the interior handle 25 of the EDL. Although not tested, preliminary calculations indicate that the battery 28, preferably lithium, of the EDL should provide enough energy to power the EDL for at least ten years. Preferably the battery 28 can be replaced only from the inside of the door 19 through the battery compartment plate 54 of inside handle 25. When the battery 28 loses approximately 90 of its capacity, a warning signal is preferably transmitted from the EDL to the HHC every time the EDL is activated, and a buzzer is enabled inside the EDL. Therefore, every time the EDL is activated, the HHC produces a brief audible warning signal to the user when the EDL battery 28 is low. A different audible signal is generated when the battery (not shown) of the HHC itself is low. In case the EDL battery 28 is not replaced in time, optionally the exterior section of the EDL may be equipped with a proprietary miniature port (not shown) which may be used to power the EDL electronics. This port may be accessed by an authorized service personnel, and is preferably electronically protected from overvoltage or shorts (e.g., with a diode). Alternatively, a photovoltaic cell (not shown) may be installed in the EDL which can charge the EDL's battery 28 when the cell is illuminated with direct light.

The EDL microprocessor 505 is programmed to accept an emergency code in the event that the HHC is lost (the EDL preferably cannot be locked from the outside without the HHC). This code is preferably comprised of two segments. The first segment of the emergency code is a standard factory code which may also be programmed into emergency HHCs carried by authorized service personnel. The second segment is a personal emergency code which is either programmed into the EDL at the factory or optionally after installation by the owner. The emergency HHC is equipped with an alphanumeric key pad which can accept the personal segment of the emergency code from the owner. To add additional security, the personal segment of the emergency code can be arranged and configured to be changed after the door is unlocked by the authorized service personnel. If RF communication is utilized, the emergency code can be remotely transmitted from an authorized service center and/or a security service.

Entrance Coding Scheme

Figure 9:
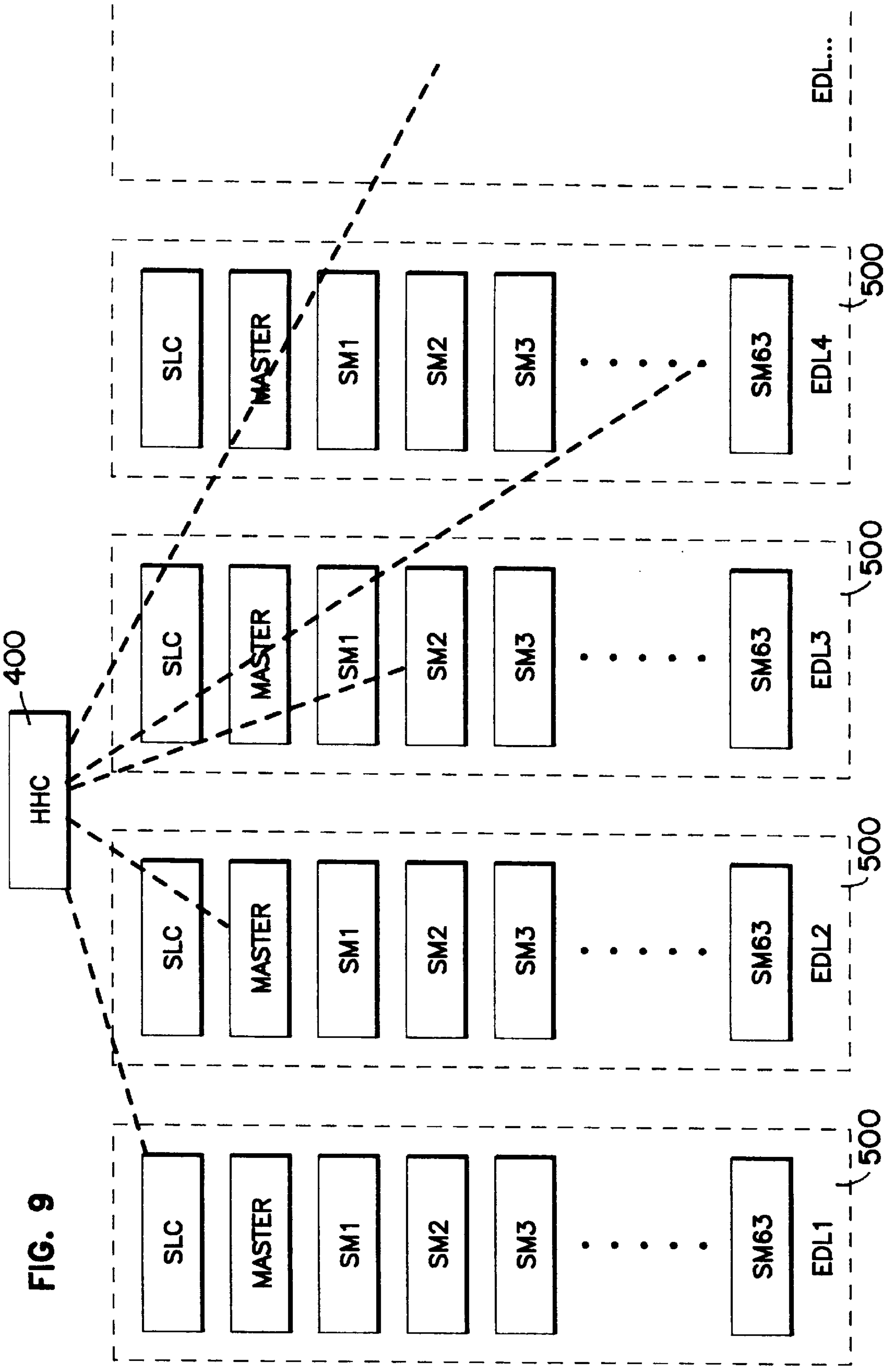
FIG. 9 is a diagrammatic illustration of the entrance coding scheme of a group of EDLs of FIG. 7.

Next, referring to FIG. 9, a discussion of the preferred coding scheme of the EDL will be presented. The EDL preferably can store 64 entrance codes. Each entrance code is comprised of 64 bits. Therefore, there is a possible 264 potential combinations (for reference, $2^{32}$ is approximately 4.3 billion). The first code of the 64 entrance codes is the specific lock code ("SLC"). The remaining 63 entrance codes may be preferably used for "master" and "submaster" HHCs (i.e., allowing a single HHC to access to any number of assigned EDLs). An individual HHC only transmits one entrance code. However, any number of EDLs can have that code entered as one of its 64 entrance codes.

When the entrance code of an HHC is programmed to match the SLC, the HHC can only lock or unlock a specific EDL (assuming that SLC codes are not duplicated in other locks). The HHC can operate in a "master" or "submaster" mode if it is programmed to transmit one of the other 63 codes (i.e., one of the codes programmed into an EDL as an entrance code). The codes may be assigned a "priority level" such that a "priority 1" code can lock and unlock any EDL in a given area, while codes with priorities 2, 3, 4, etc. can lock or unlock a smaller number of EDLs. FIG. 9 illustrates an example of this entrance code priority level scheme.

Thus, the present preferred system allows for 62 levels of "submasters" in addition to the main "master" code. Those skilled in the art will appreciate that different priority levels cannot have the same code to prevent HHCs with lower priority from locking or unlocking EDLs which are limited to higher priority HHCs. This priority method allows for a very effective enforcement of limited access to sensitive areas. Those skilled in the art will also appreciate that a given EDL and a number of matching HHCs can be programmed to have the same SLC by the manufacturer or by the owner with the use of an EDLP 600 (described below).

Communication Scheme

The communication between the HHC and the EDL is based on spread spectrum communication (SSC). This technique allows for a frequency of a given carrier signal to change continuously with time according to a preset time-varying frequency program. Unlike standard frequency modulation (FM) in which the carrier frequency varies by a small percentage, the frequency variation of the carrier signal in SSC is virtually unlimited. Therefore the bandwidth of the SSC carrier can become extremely broad and allows for the transmission of vast amounts of lower frequency digital information such as the various entrance codes of the present electronic lock system.

Figure 10:
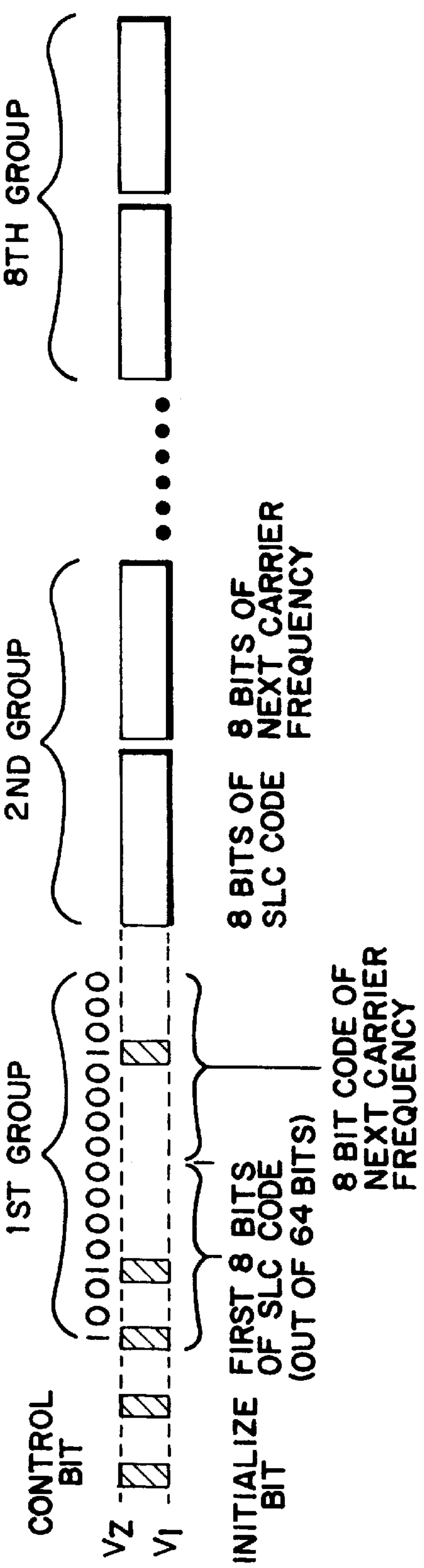
FIG. 10 is an illustration of a preferred communication timing diagram utilized by an HHC and an EDL of FIGS. 6 and 7.

Referring next to FIG. 10, the amplitude of the transmitted carrier is illustrated as being keyed (i.e., switched on and off) by the digital information of the entrance codes. In order to receive the transmitted signal, however, the receiver must be able to tune to a synchronized duplicate of the transmitter's frequency program. The digital information is then obtained by standard AM demodulation. The minimum bandwidth necessary to transmit the desired information is called the information bandwidth.

The advantage of using SSC versus other common methods of information transmission (e.g., AM or FM) can be quantified by the process gain ($G_p$) which is the ratio between the overall carrier bandwidth and the information bandwidth. As those skilled in the art will recognize, a major advantage of the SSC technique is that the signal-to-noise ratio of the communication system is improved by a factor which is equal to $G_p$. Because $G_p$ for SSC is normally larger than $G_p$ for other communication techniques, the signal to noise ratio of an SSC system is far superior to those systems. Additionally, SSC has better radio interference immunity compared to other transmission systems.

The time-varying programmed changes in the frequency of the carrier is commonly called frequency hopping, and is normally accomplished in an electronic circuit called a frequency synthesizer (discussed below). For successful decoding of a set of given information, the transmitter and receiver must use the same time-synchronized frequency program. The protocol for such synchronization is quite complicated. However, the present invention utilizes a communication method which eliminates the need for a synchronization protocol. In the present system the frequency program is transmitted to the receiver as part of the transmitted information. Thus, the receiver must be tuned to an initial default frequency of the SSC signal in order for the communication procedure to begin.

The procedure for communication between the HHC and EDL can therefore be summarized as follows. Still referring to FIG. 10, first, when the HHC is activated, an initializing pulse is transmitted to the EDL which turns on its electronic package 500 (the EDL is normally "dormant" to conserve battery 28 power). Then a second pulse (a control bit) is transmitted to the EDL to indicate whether the user wishes to lock or unlock the EDL. If the EDL is already at the desired state a confirmation signal may be transmitted by the EDL to the HHC, and an appropriate "locked" or "unlocked" LED 412 built into the HHC may flash.

The entrance code is preferably transmitted in segments of eight bits interrupted by eight bits for the next carrier frequency code, however, other numbers of bits might be used. For an eight bit segment, 256 discrete carrier frequencies (between 1 and 40 kHz for IR communication, or 4 and 100 Mhz for RF communication) are used. Those skilled in the art will recognize that with a larger number of frequencies, the transmission looks more like noise and is more difficult to successfully decipher the code. Each of these carrier frequencies is identified by an eight bit code. During the interval in which the HHC communicates with the EDL, a new frequency code is selected by the HHC at random after the transmission of each eight bit segment of the entrance code. (Only the initial carrier frequency is fixed so that communication between the HHC and the EDL can be established). The random code is selected by choosing an eight bit code and going to a look-up table stored in EPROM which correlates the eight bit code to a frequency. This new frequency is then delivered to the frequency synthesizer 408 of the HHC. The HHC then transmits the eight bits of the entrance code and then eight bits which identify the next carrier frequency to the EDL. The carrier frequency of the HHC changes before the next eight bits of the entrance code and the next carrier frequency code are transmitted. The transmission is concluded when eight groups, each group being comprised of eight bits of the entrance code and eight bits of the next carrier frequency, are transmitted.

The EDL decodes the transmitted information using the coded carrier frequencies and converts it into a digital code. The EDL must have an identical look-up table correlating carrier frequencies with eight bit codes to that look-up table found in the HHC, or the information will not be properly decoded by the EDL. Thus, not only is the EDL protected by the 64 bit entrance code, but it is also protected by the random combination of carrier frequencies over which the entrance code may be transmitted.

Assuming complete reception of the codes, the code is then compared with the codes stored in the EDL's nonvolatile memory, and if there is a match, the DC motor 21 is activated to switch the EDL to a locked (or unlocked) state. When the DC motor 21 stops and the end switch 57 is engaged, a confirmation code may then be transmitted to the HHC if desired.

It will be appreciated by those skilled in the art that since any of the 256 carrier frequencies might be utilized at random, for successful communication between a given HHC and an EDL, it is necessary that all 256 carrier frequencies which might be utilized by the HHC must also be utilizable by the EDL, even though only a maximum of eight carrier frequencies are used each time the HHC is activated. Hence, the SSC transmission scheme can drastically reduce the number of HHC's which can communicate with a given EDL because it is possible to produce groups of HHC's and EDLs that have different matching sets of carrier frequencies which are preset at the factory. Obviously, HHCs and EDLs from different groups cannot communicate because their programmed carrier frequencies do not match (except due to an extremely remote fortuitous occurrence). Thus, in addition to the security provided by the entrance code itself, the number of HHCs which can actually establish communication with the EDL may be restricted by the manufacturer. Additional HHCs can be matched to a given EDL by specifying the EDL "type" (e.g., a serial number). Users of large numbers of EDLs can arrange with the factory to have a specific group of 256 carrier frequencies assigned especially to them. Those skilled in the art will also appreciate that any number of frequencies might be utilized, and that the number of frequencies (as well as the eight bits used to correlate the frequencies) are a matter of design choice, with the cost and method of transmission being factors, among others.

An important advantage of SSC is that it virtually eliminates duplication or decoding of an HHC. In the event that an HHC does not match a given EDL, and additional codes are received by the EDL the electronic circuit is preferably disabled for three minutes after a predetermined number of unsuccessful attempts. The purpose of this procedure is to prevent unauthorized users from methodically scanning through all possible codes.

When the microprocessor senses a malfunction in the hardware it may switch to an optional secondary electronic system (not shown). The secondary system is preferably identical to the primary system. While this secondary system provides redundancy for important locking applications, its additional cost and size may not make it practical for all embodiments of the present invention. The EDL may also transmit a warning to the HHC when a secondary system is in operation, resulting in an audio/visual warning for the user in the HHC.

HHC Electronics 400

Next presented will be a description of the HHC electronics module 400. FIG. 1 illustrates a device 900, which may be either an HHC device 400 or an EDLP 600.

In the preferred embodiment, the HHC electronics module 400 and the EDL electronics module 500 are comprised of similar functional blocks/components. Accordingly, the description of similar components (i.e., MPU 405 and 505)

will not be gone into at length below in connection with EDL electronics module 500.

Referring to FIG. 6, under normal conditions the HHC is dormant. This is accomplished by means of a Watchdog Timer 401. The HHC has two switches 402 and 403 which provide the "unlocked" and "locked" functions, respectively. When either of the two switches 402, 403 is pressed, the PIO (Parallel Input/Output) 404 will generate an interrupt request for the MPU (Micro Processor Unit) 405 which effectively turns the HHC hardware on. The HHC is turned off by the confirmation signal from the EDL when it is switched into a locked or an unlocked state. If no confirmation signal is received, then the Watchdog Timer 401 turns the electronics module 400 off. The carrier frequency program, and the EDLP access code reside in nonvolatile RAM (Random Access Memory) 406. The initializing pulse is transmitted by synthesizer 408 at a given default frequency (e.g., either 40 Khz for IR or 4 Mhz for RF).

The MPU 405 is preferably a controller manufactured by Motorola having a designation of MC6805. However, any processor/controller which provides for input/output, can decode input signals, and fetch and store information from memory might be utilized, as those skilled in the art will recognize.

The foregoing programming of the carrier is accomplished via the frequency synthesizer 408 which is controlled by MPU 405. The program which executes this control resides in ROM 407. This program produces the sequence of eight 16 bits words each consisting of 8 bits of SLC and 8 bits of carrier frequency code (The carrier frequency changes before the next 8-bits of SLC is transmitted). The output of the synthesizer 408 is then switched on and off sequentially according to the digital content of each 16 bit word. In the preferred embodiment, the synthesizer 508 is actually the transmitter. The IR or RF sensor 410 (this device is either an IR source combined with an IR detector, or a wideband antenna) is normally in the receive mode but is switched by the receiver 409 to the transmit mode if the output of the frequency synthesizer 408 is nonzero. The transmission of this information is preceded by an initializing bit followed by a control bit which informs the EDL whether it is to be switched to a locked or an unlocked state.

In the preferred embodiment, the sensor 410 is comprised of an IR detector (manufactured by General Electric having the designation L14F2) and an IR emitter (manufactured by General Electric having a designation LED56). The frequency synthesizer 408 generates a frequency carrier that is proportional to a binary "word" that is provided to its input by MPU 405. In addition there is another input which can be used by #MPU 405 to disable frequency synthesizer 408 output. In the preferred embodiment, the frequency synthesizer used is manufactured by Motorola having the model designation MC4046.

Receiver 409 (best seen in FIG. 11), used to receive signals from the EDL 500, is connected to the sensor 410 and frequency synthesizer 408, and mixes the signals at mixer block 409*a*. The output of the mixer 409*a* is the input frequency from the sensor 410 minus the frequency synthesizer 408 frequency. This output is provided to IF amplifier block 409*b*, which amplifies the signal for detector block 409*c*. Detector block 409*c* removes the high frequency (carrier) components. Those skilled in the art will recognize that by changing the frequency of synthesizer 408, the receiver can be tuned at different frequencies. The decoded signal is then provided to MPU 405. In the preferred embodiment, receiver 409 is manufactured by National SemiConductor having the model designation LM1872N.

The confirmation signal from the EDL is received by receiver 409. The MPU 405 recognizes whether the EDL is locked or unlocked and one of the LEDs 412 is turned on for 3 seconds. If an attempt is made to switch the EDL to a state to which it is already switched, the appropriate LED flashes for 3 seconds.

In the event that the EDL's MPU 505 senses a malfunction which prevents the EDL from completing a given function, a warning signal is transmitted to the HHC. This signal is recognized by the HHC's MPU 405 which toggles the LEDs 412 and enables an audible warning using buzzer 420. Failures of the HHC itself are signaled with a different (audible) signal using buzzer 420. For example, the HHC can be equipped with a second optional backup circuit and such a signal may be issued when the monitor 411 switches to the backup circuit when it senses a failure in the primary hardware of the HHC. Also, the HHC battery may be monitored by MPU 405, and when the battery voltage drops below 90% of its nominal value, buzzer 420 sounds when the HHC is activated.

In the preferred embodiment the electronic package of the HCC measures 12 mm×8 mm. This package is preferably built around a proprietary integrated circuit and hence the power dissipation is kept to a minimum. The HHC is preferably built in a small package which might typically measure 2.5 cm×1.5 cm×0.5 cm.

The HHC can be programmed with the EDLP 600. The communication between the HHC and EDLP is established via IR or RF transmission using SSC. An initializing code advises MPU 405 that the entrance code is to be reprogrammed. The EDLP then sends an access code to the HHC which MPU 405 compares with the access code residing in RAM 406. If the code matches, the SLC and the access codes of the HHC can be programmed. Note that the programmer must have the same frequency program as the HHC for successful communication.

EDL Electronics 500

Next is a description of the EDL electronics module 500. As previously noted, the functional components are similar to the HHC and so will be discussed generally in terms of function in the EDL. Referring to FIG. 7, under normal conditions the EDL is dormant. When the initializing pulse transmitted by the HHC is sensed, the EDL is switched on and the receiver 509 is tuned to a default frequency of either 40 Khz (IR) or 4 Mhz (RF). The sensor 510 is either a combination of IR detector/source or a wide-band antenna. The signal received by the sensor is then fed to the receiver 509. This signal (best seen in FIG. 10) is comprised of 1 bit (control bit) of information indicating whether the EDL is to switch to the locked or unlocked state, followed by eight 16 bit words each containing 8 bits of entrance code and 8 bits of carrier frequency code. The MPU 505 recognizes the control bit and determines the direction of rotation of the DC motor. The first 8 bits of each 16 bit word are used to construct the entrance code while the last 8 bits are the code which identifies the next frequency so the receiver can be tuned to the carrier frequency of the next transmission (which contains another 16 bit word). At the end of the transmission MPU 505 tunes the receiver 509 to the default frequency.

Figure 11:
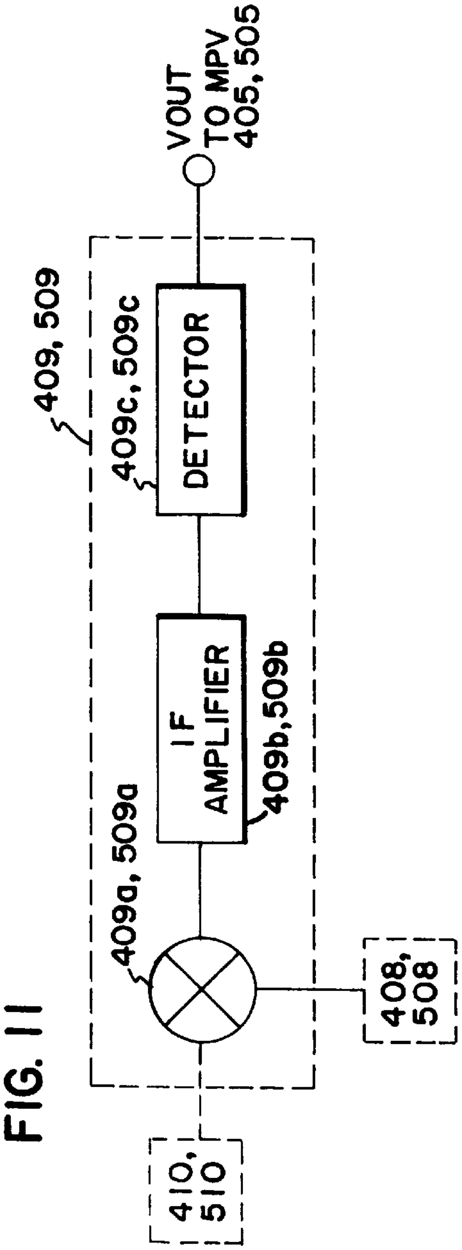
FIG. 11 is a functional block diagram of block 409 and 509 of FIGS. 6 and 7.

Once the 64 bit SLC code is received by the MPU 505, the received entrance code is compared with the codes stored in RAM 506 which can contain up to 64 codes (best seen in FIG. 11). If a match is found, the MPU 505 sends a signal to PIO 504 which enables the DC motor 21. The motor 21 turns either clockwise or counterclockwise depending on the status of the control bit. The motor continues to turn until one of the two end contacts of the end switch (FIG. 1A) is engaged and a confirmation signal is sent by PIO 504 to MPU 505. The sensor 510 is optionally switched to a transmit mode and frequency synthesizer 508 transmits the confirmation to the HHC. A different confirmation signal is transmitted to the HHC if the DC motor 21 does not move because of an attempt to switch the EDL to an existing state.

If the code transmitted to the MPU 505 does not match any of the codes stored in RAM 506, MPU 505 increments by 1 an internal counter which is reset to 0 every time the EDL is dormant. When the output of this counter is 3, MPU 505 switches the EDL to a dormant mode which cannot be interrupted for three minutes. At the end of the three minutes the EDL remains in the dormant mode until it is awakened again.

Figure 12:
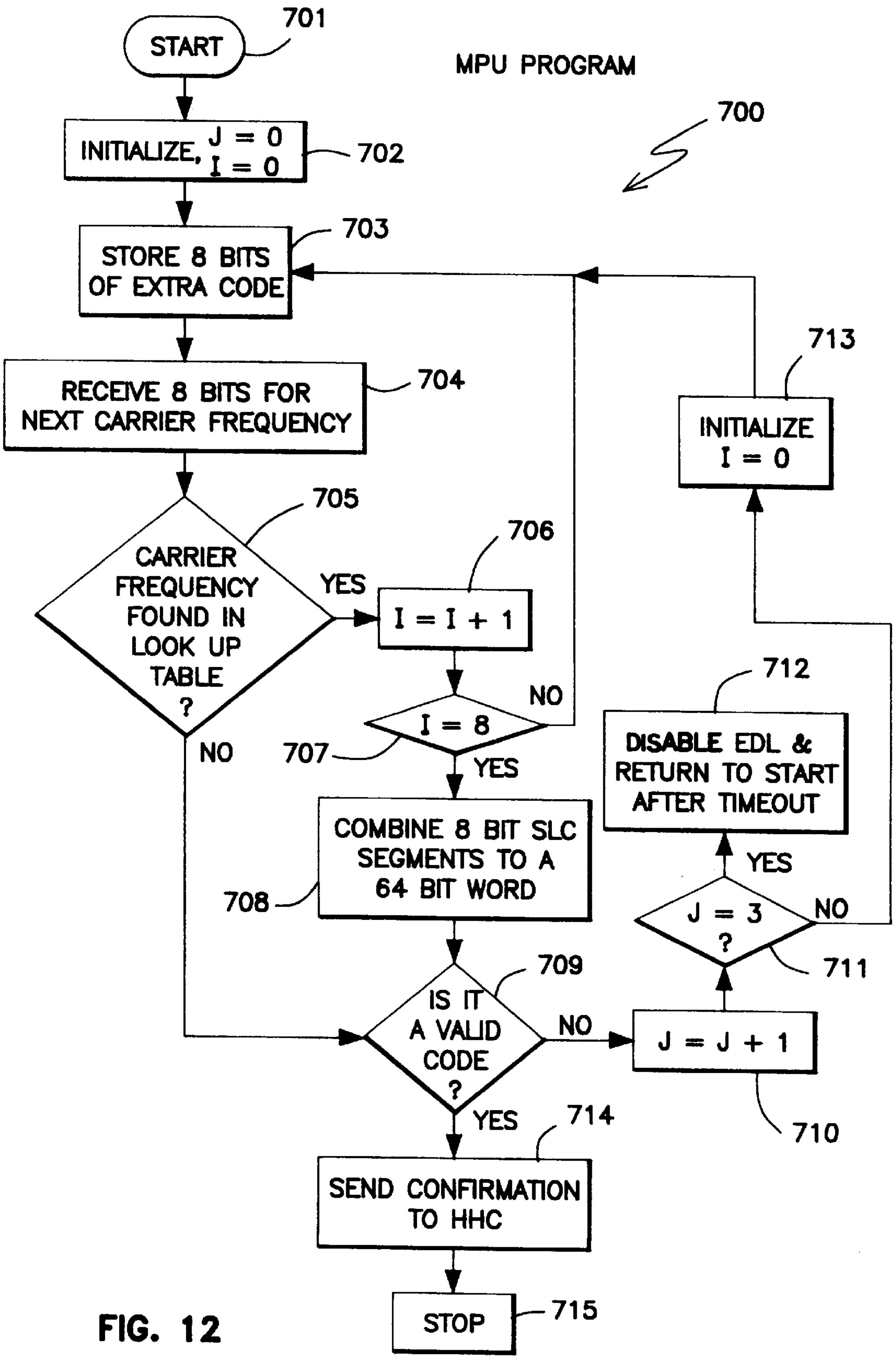
FIG. 12 is a logic block diagram illustrating computer program operation of block 505 of FIG. 7.
Figure 13:
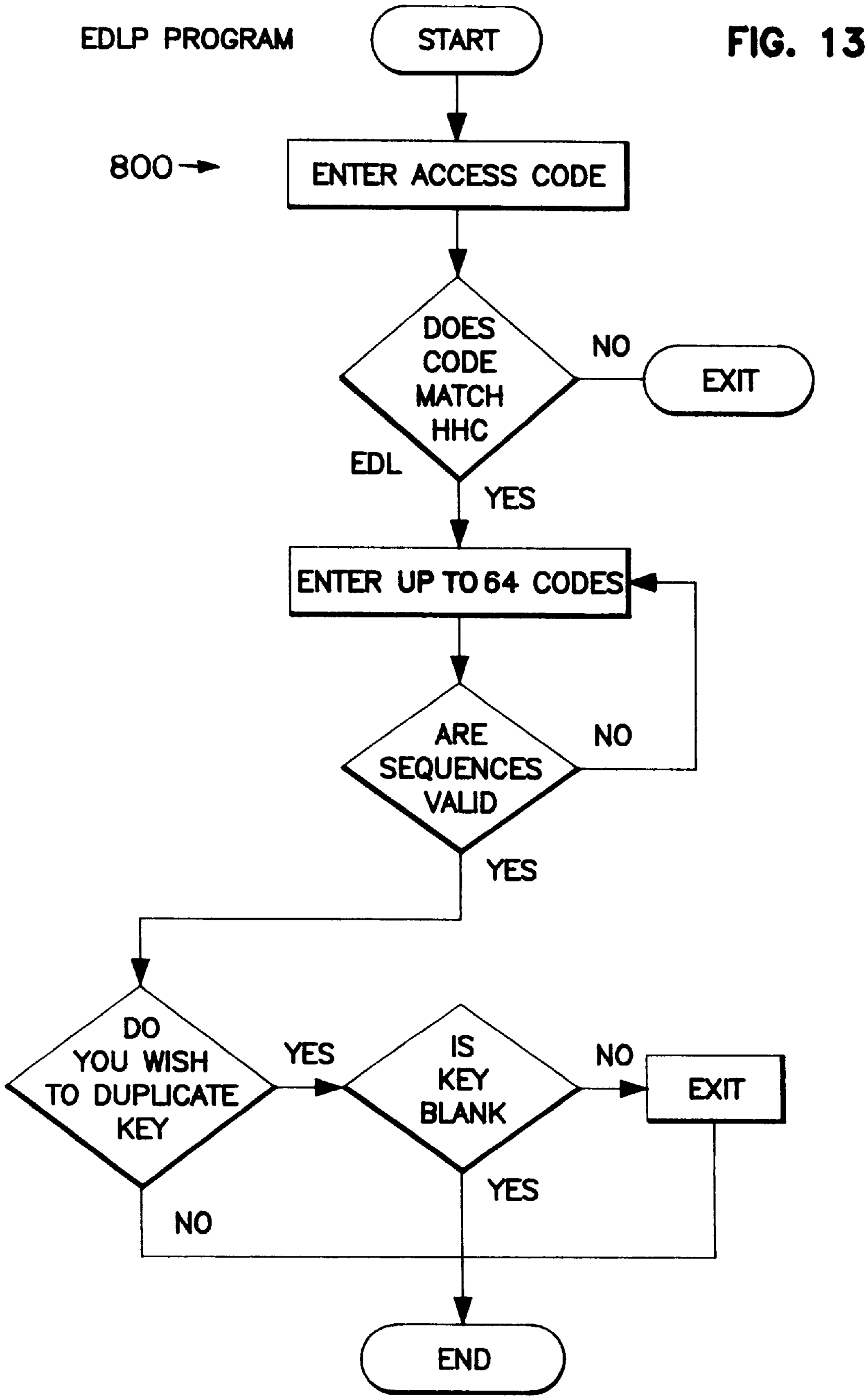
FIG. 13 is a logic block diagram illustrating computer program operation of block 605 of FIG. 8.

FIG. 12 illustrates a logic flow diagram of an embodiment of the program logic which might be resident in MPU 505, RAM 506 or ROM 507. In FIG. 12, the logic diagram is shown generally as 700. The logic flow diagram 700 illustrates the steps taken to analyze the logical status of the received entrance code from the HHC.

Although the MPU 505 will be characterized as "preceding" from logical block to logical block, while describing the operation of the program logic, those skilled in the art will appreciate that programming steps are being acted on by MPU 505.

In operation, MPU 505 starts at block 701. MPU 505 then proceeds to block 702 to initialize two variables to zero which will be used in control loops in the logic flow 700. At block 703, the first 8 bits of entrance code are received from receiver 509 and the 8 bits are stored in RAM 506. As discussed above, the last 8 bits of the first received word are utilized to change the carrier frequency). MPU 505 must determine if the received carrier code is a valid code. Therefore, MPU 505 proceeds to block 705 and compares the received carrier code to a look-up table in nonvolatile RAM 506 in order to find the correct word to deliver to frequency synthesizer 508 to tune receiver 509 for the next transmitted word from the HHC. Additionally, at block 705, MPU 505 determines whether a proper carrier frequency was found. If the carrier frequency is found in the look-up table, the MPU 505 proceeds to block 706 where the first control loop variable is incremented. MPU 505 then proceeds to block 707 where it is determined whether the entire 8 groups of entrance codes and carrier frequency codes have been received. If more codes are to be received, MPU 505 returns to block 703 to receive the next group.

In the event that the carrier frequency is not found in the look-up table at block 705, MPU 505 proceeds to block 709 where it is determined whether a valid code is being generated. If a valid code is not being generated, a second control loop is incremented at block 710 and at block 711 it is determined whether the improper code control loop has been incremented three times. If three invalid codes have been reached, then the EDL is disabled at block 712. If the second control loop has not reached three, then at block 713 the first control loop variable is initialized to zero and MPU 505 proceeds to block 703 to begin receiving a new transmission from the HHC.

Once the entire entrance code is received at block 707, MPU 505 proceeds to block 708 where MPU 505 retrieves the entire 64 bit entrance code from RAM 506. MPU 505 then proceeds to block 709 to compare the 64 bit code against the 64 codes stored in the nonvolatile RAM 506. If the code matches, MPU 505 proceeds to block 710 to send confirmation to the HHC. If the code is not valid, then MPU 505 proceeds to block 710 through the second control loop. Once the confirmation is sent to the HHC, MPU 505 Watchdog Timer (not shown) times the system out and the EDL electronics module 500 goes dormant. The logic flow 700 ends at block 715.

An important optional function of MPU 505 is the programming of the voltage to the DC motor 21. Considerable battery power may be conserved by rapid switching of the voltage to the motor 21 during its operation. This scheme exploits the inertia of the permanent magnet of the motor 21 (i.e., the rotor) when the power to the motor 21 is turned off. MPU 505 may also monitor the electric current through the motor. When the motor current is 27% higher than the nominal operating current, MPU 505 disconnects the power from the motor 21 to prevent permanent damage, transmits a warning signal to the HHC 400 and enables buzzer 520. When the voltage of the EDL's battery drops below 90% of its nominal value, a warning is transmitted to the HHC and buzzer 520 is enabled every time the EDL is activated. The program code executed by the MPU 505 resides in ROM 507. Monitor 511 periodically checks the hardware of the EDL. When a malfunction is sensed, monitor 511 switches to the emergency secondary system, a warning signal is transmitted to the HHC, and the buzzer 520 is enabled. In order to conserve power, the EDL hardware is checked only when the EDL is activated.

The EDL is switched to the dormant state by a Watchdog Timer (not shown) after the confirmation signal is transmitted to the HCC.

The electronic package 500 of the EDL is preferably based on a proprietary integrated circuit and hence has the same approximate physical dimensions as the HHC electronic package 400. When the EDL is in the dormant mode, the current drain from its battery is extremely small.

The EDL can be programmed with the EDLP 600. The communication is established via IR or RF transmission using SSC. An initializing code advises MPU 505 that the entrance code is to be reprogrammed. The EDLP then sends an access code to the HHC which MPU 505 compares with the access code residing in RAM 506. If the code matches, any number of the 64 entrance codes can be changed, as well as the emergency code and the EDLP access codes of the EDL. Note, however, that in the preferred embodiment the EDLP must have the same frequency program as the EDL for successful communication.

EDL Programmer (EDLP) 600

Figure 8:
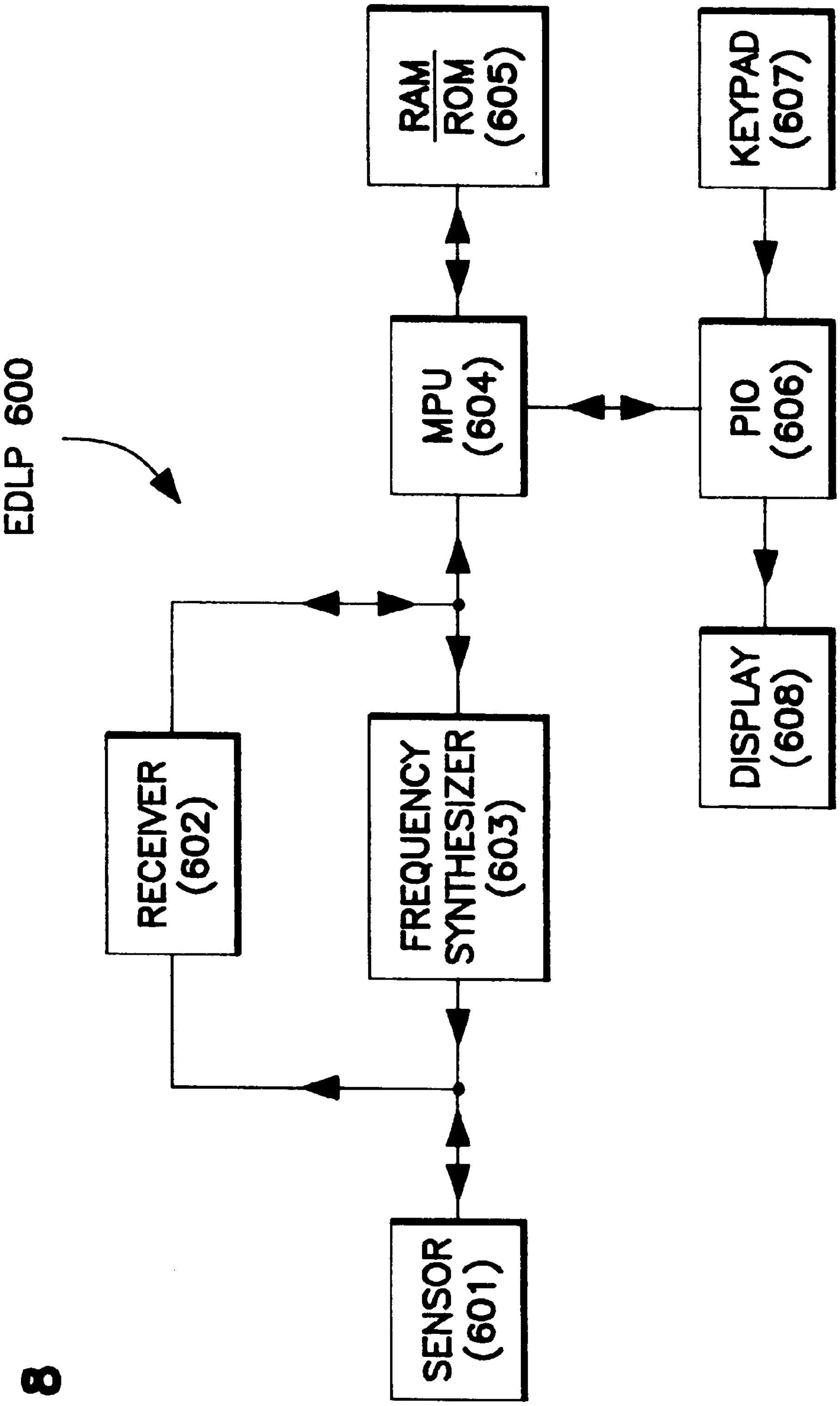
FIG. 8 is a functional block diagram representation of the electronic programmer portion (EDLP) of the doorlatch lock of FIG. 2.

Another part of the present system is the EDL/HHC Programmer (EDLP) 600 which is a hand-held microcomputer, a functional block diagram of which is illustrated in FIG. 8 generally at 800. The EDLP is configured and packaged as a hand-held calculator and has an LCD display which is used to instruct the user how to proceed with the programming of the EDL or the HHC (using menu-driven software).

The EDLP can be used to program any 64 bit alphanumeric code into the HHC, and a sequence of 64 alphanumeric entrance codes (each 64 bits) into the EDL. The EDLP consists of MPU 604 which executes a program stored in ROM/RAM 605. This is a user-friendly menu-driven program that guides the user through its various stages and has an ON-LINE HELP facility. Interactive input and output are provided through display 608 and keypad 607. The general purpose I/O PIO 606 formats the input from keypad 607 to digital information, and converts the output of MPU 604 to alphanumeric characters which appear on display 608. The operation of sensor 601, receiver 602, and frequency synthesizer 603 is similar to the operation of the corresponding components in the HHC and EDL.

The programming of an HHC or an EDL can only be accomplished if it is initialized with a personal access code which matches an access code in the EDL or HHC. The access code is programmed into the HHC or EDL at the factory, and can be changed by the owner after installation. The programming of the EDL and the HHC is carried out via IR or RF transmission using SSC. The EDLP sends an initializing code which advises the local MPU (405 or 505) that the entrance code is to be reprogrammed. The EDLP then sends an access code to the HHC or EDL which is compared with the access code residing in the local RAM (406 or 506). If the code matches, the HHC or EDL can be programmed. Note that the EDLP must have the same frequency program and initial default frequency as the HHC and EDL for successful communication. When the programming is completed the programmed code is transmitted back to the EDLP for verification. FIG. 14 illustrates a logic flow diagram of a program which may be utilized by EDLP 600.

Alternative Embodiment

The HHC can alternatively be replaced with a relatively inexpensive device which comprises a coded two-dimensional backlit graphic pattern measuring approximately 1 cm×1 cm, although other sizes might be used. The EDL is equipped with an optical window which is used to image the pattern of the HHC onto a square two-dimensional photodiode array comprised of 256 elements (arrays having more elements might also be utilized). The array is electronically scanned inside the EDL by scanner 512 (best seen in FIG. 7), and the pattern is decoded and compared with other codes residing in memory. The cost-effective HHC does not utilize two-way communication and may include no battery since the back lighting of the pattern can be accomplished using phosphorescent materials. Additionally, this method could be expanded to include complex optical pattern recognition in the EDL and the replacement of the HHC by positive identification of fingerprints.

Other enhancements, as those skilled in the art will appreciate, may include: (a) a local clock in the EDLs and the HHCs to allow or prevent access at preprogrammed times, (b) two-way communication used to retrieve information from the EDL regarding identity of HHCs holders and the times of access (for this purpose the HHC may be programmed with a user ID code which is recorded by the EDL), and (c) powering the electromechanical device by other means, such as by electrostrictive actuators.

The circuit configuration, two-way communication, and type of latch mechanism described herein (among others) are provided as examples in an embodiment that incorporates and practices the principles of this invention. Other modifications and alterations are well within the knowledge of those skilled in the art and are to be included within the broad scope of the appended claims.

What is claimed is:

1. An electronic lock apparatus, comprising:

(a) a strike plate;

(b) a latch cooperatively engageable with said strike plate and movable between engaged and disengaged positions;

(c) mechanical locking means, operatively connected with said latch, for selectively preventing movement of said latch between said engaged and disengaged positions, said locking means requiring only a primary motive force acting coincidentally along or about a locking axis for said selective prevention of movement;

(d) electromechanical means, operatively connected to said mechanical locking means, for providing the primary motive force to said locking means; and (e) electronic control means, responsive to an encoded received signal, for selectively energizing said electromechanical means, wherein said electromechanical means provides force only along or about the locking axis.

2. The lock apparatus of claim 1, wherein said encoded received signal includes a first set of encoded signals and a second set of encoded signals, wherein both of said first and second sets of encoded signals must be determined to be valid by said electronic control means prior to energizing said electromechanical means.

3. The lock apparatus of claim 2, wherein said electronic control means includes means for comparing said first and second sets of encoded signals with predetermined sets of reference signals stored in a memory location.

4. The lock apparatus of claim 3, wherein said first and second sets of encoded signals each include a predetermined number of subsets, said subsets of said first set of encoded signals being received by said electronic control means in an alternating manner with said subsets of said second set of encoded signals, whereby said subsets of said first and second set of encoded signals are interleaved with one another.

5. The lock apparatus of claim 4, wherein said electronic control means includes receiver means for receiving said encoded signals and microprocessor means, said receiver means being tunable by microprocessor means to receive a plurality of frequency modulated signals, and wherein each of said subsets of said second set of encoded signals includes information which correlates to the frequency at which the subsequent said subset will be modulated, whereby said microprocessor means tunes said receiver means after receiving each of said subsets of said second set of encoded information.

6. The lock apparatus of claim 1, wherein said electromechanical means is a D.C. motor.

7. The lock apparatus of claim 1, further comprising at least one knob, said knob being arranged and configured to actuate said latch between said engaged and disengaged positions, wherein a user provides the force to actuate said latch.

8. The lock apparatus of claim 7, wherein said knob is arranged and configured to include a sensor, said sensor being operatively connected to said electronic control means for detecting said encoded received signal.

9. The lock apparatus of claim 1, further comprising a signal generator means for generating said encoded received signal upon activation by a user.

10. The lock apparatus of claim 9, wherein said signal generator is independent of said electronic control apparatus.

11. An electronic lock system, comprising:

(a) key means for generating a signal;

(b) receiver means for receiving said signal;

(c) processor means, cooperatively connected to said receiver means, for comparing said received signal with a stored reference signal and for generating an actuation signal if said received signal is determined to be equivalent to said reference signal;

(d) primary mover means, operatively connected to said processor means and wherein said primary mover means includes a shaft cooperatively connected to a lock mechanism which is engaged and disengaged solely by a rotation of a locking rod about the longitudinal axis of said rod, for rotating said rod in response to said actuation signal, wherein only the primary mover means is used to rotate said rod thereby locking and unlocking the lock mechanism.

12. The electronic lock system of claim 11, wherein said shaft of said primary mover means rotates a fraction of one revolution in response to said actuation signal.

13. The electronic lock system of claim 12, wherein said motor means rotates 90 degrees or less in response to said actuation signal.

14. The electronic lock system of claim 12, further comprising rotation stop means for positively limiting the rotation of said shaft, said stop means generating a deactivate signal received by said processor means, wherein said processor terminates said actuation signal upon receipt of said deactivate signal.

15. The electronic lock system of claim 12, wherein said signal generated by said key means is a frequency modulated signal.

16. The electronic lock system of claim 12, further comprising:

(a) a retractable latch;

(b) a strike plate for engaging said latch;

(c) at least one handle having an axis of rotation, said handle cooperatively connected to said latch, wherein rotating said handle about said axis retracts said latch relative to said strike plate.

17. The electronic lock system of claim 16, further comprising:

(a) a biased shell member arranged and configured within said handle and connected between said handle and said latch, said shell member tending to rotate said handle to a predetermined location about the said axis of said handle;

(b) a cam member cooperatively engaged within said shell member and having a channel formed therethrough, said channel receiving said rod, wherein rotation of said rod rotates said cam member within said shell member, said cam member further including a tapered channel formed in the exterior thereof; and (c) cam engagement means, cooperatively located in said tapered channels, for preventing rotation of said shell member when said rod is rotated to a locked position, wherein said cam engagement means are forced by said tapered channel into an engaging notch.

18. A lock apparatus for an entryway door, of the type wherein a latch engages a strike plate, comprising:

(a) a locking bar for engaging and disengaging a cam which prevents a locking mechanism from moving the latch between an engaged position with the strike plate to a disengaged position with the strike plate, said locking bar rotating about its longitudinal axis;

(b) remote component means for generating a coded signal; and (c) resident component means for receiving said coded signal, for comparing said coded signal with a stored predetermined reference signal, for generating an actuation signal if said coded signal matches said stored predetermined signal, and for rotating said locking bar, wherein said resident component means introduce only the physical rotation coincidentally along or about said longitudinal axis of said bar to lock said locking mechanism.

19. The lock apparatus of claim 18, wherein said coded signal is transmitted either optically or by radio transmission.

* * * * *